United States Patent [19]

Cubitt et al.

[11] 4,000,563
[45] Jan. 4, 1977

[54] APPARATUS FOR DRYING OR COOLING PARTICULATE MATERIAL WITH A GAS

[75] Inventors: John A. Cubitt, Mossley via Ashton-under-Lyne; Henry Ellwood, Rochdale, both of England

[73] Assignee: USM Corporation, Boston, Mass.

[22] Filed: Feb. 13, 1975

[21] Appl. No.: 549,834

[30] Foreign Application Priority Data

Feb. 16, 1974 United Kingdom .............. 7167/74

[52] U.S. Cl. .................................. 34/10; 34/57 A; 34/57 C; 34/217
[51] Int. Cl.² .......................................... F26B 3/08
[58] Field of Search ........................... 302/29–31; 432/77, 79; 34/10, 13, 62, 57 A, 57 C, 210–211, 217, 232

[56] References Cited

UNITED STATES PATENTS

| 1,844,635 | 2/1932 | Caller | 302/31 |
| 3,214,844 | 11/1965 | Oates et al. | 34/57 A |
| 3,543,414 | 12/1970 | Gomarin | 34/57 A |
| 3,733,056 | 5/1973 | Fong | 34/57 A |

Primary Examiner—John J. Camby
Assistant Examiner—Larry T. Schwartz
Attorney, Agent, or Firm—Ralph D. Gelling; Richard B. Megley; Vincent A. White

[57] ABSTRACT

The invention relates to a chain of modules constructed to sequentially dry plastic particles each module comprises a mixing chamber having a trough formed therein, the trough having side walls inclined to the horizontal and a slot extending along the bottom thereof. The slot is covered by a grating to permit passage of air into the mixing chamber but to prevent particulate material from falling out of the trough through the slot. A pressure chamber is constructed immediately below the trough in the body portion of the module and means, are provided for delivering air to the pressure chamber thereby causing a stream of air to be forced upward into the mixing chamber through the slot in the trough. Each module is tilted to provide a flow of plastic particles through the trough.

1 Claim, 5 Drawing Figures

Fig. 5
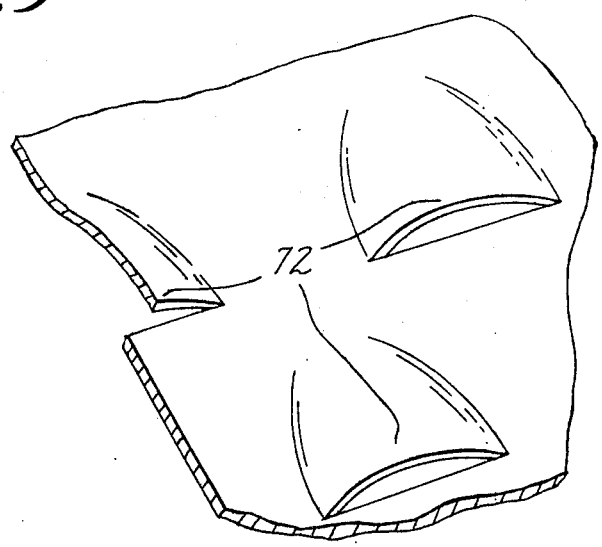
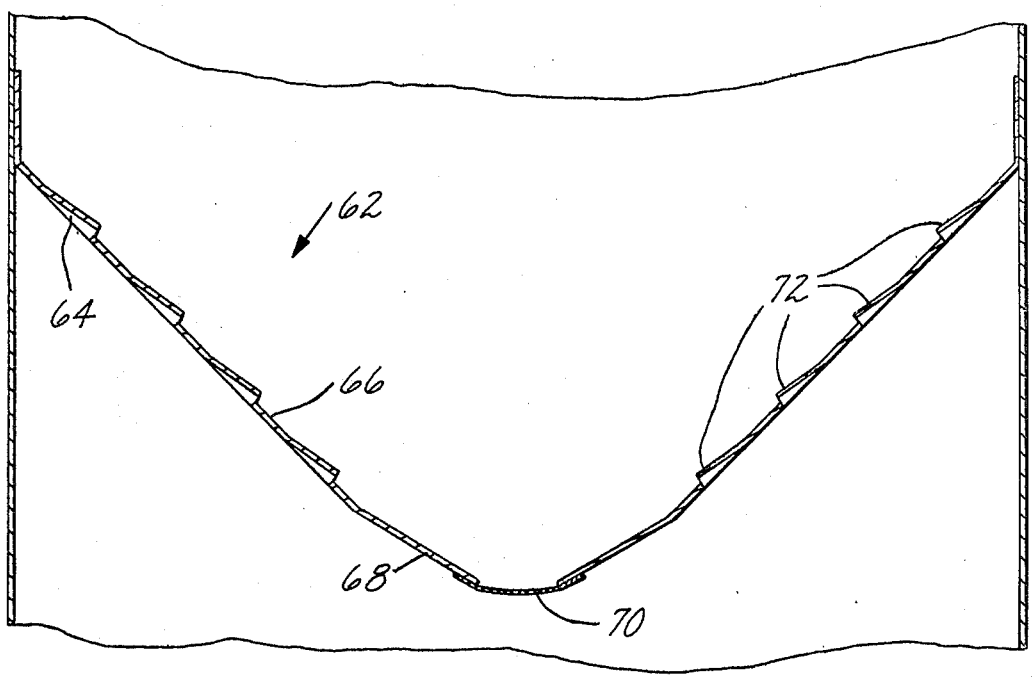
Fig. 4

APPARATUS FOR DRYING OR COOLING PARTICULATE MATERIAL WITH A GAS

BACKGROUND OF THE INVENTION

It is the purpose of this invention to cool or dry particulate material. In the case of the processing of plastic material it is sometimes necessary to cool the plastics pellets after they are formed. Generally as these pellets cool, they form a relatively hard outer shell with a hot sticky core and if they are allowed to accumulate or bunch together the particles will tend to melt and stick together causing severe problems at later processing stages. It is therefore desirable to keep the particles in continuous motion as they are cooled.

It is therefore the purpose of this invention to provide apparatus which creates a channel in which the plastic granules can pass, while creating a forced air stream to cause continuous circulation of the granules as they move through the channel. As the air moves around the granules, the granules cool and become hard throughout.

BRIEF DESCRIPTION OF THE INVENTION

It is sometimes necessary to treat particulate material, for example granules of plastic or rubber, with gas, for example air, to cool or dry the particulate material.

One of the various objects of the present invention is to provide improved apparatus for treating particulate material with gas.

The apparatus comprises a trough having side walls provided by side members inclined at an angle of about 45° to the horizontal, and bottom members inclined at about 30° to the horizontal; the bottom members having inner edge portions which are spaced apart to provide a slot extending along the bottom of the trough, the slot being covered by a grating to permit passage of air therethrough but to prevent particulate material leaving the trough through the slot. The dimensions of the holes in the grating are selected to be such that the particulate material cannot pass therethrough. The apparatus is made up of a number of modules each having its own trough, the troughs of the modules being connected together to provide a continuous channel. Each of the troughs of the modules is provided with a cover comprising metal gauze substantially coextensive with the area of the top of the trough. The openings in the metal gauze are of such a size that the particulate material which is to be treated cannot pass through the openings.

Each of the modules comprises a body portion by which the trough of the module is supported, the body portion being carried by means, including support members, by which the angle of inclination of the trough of the module may be adjusted over a range from 0° to 10° with respect to the horizontal. Each of the modules comprises a pressure chamber bounded by the trough of the module and the body portion of the module and means, namely blower units, for delivering air to the pressure chamber.

A dam may be mounted at an outlet end portion of the trough of the outlet module for movement between a first position in which the dam impedes flow of particulate material along the trough and a second position in which flow of particulate material along the trough is not impeded.

Air is delivered by the blower unit to the pressure chamber of each of the modules and leaves the pressure chamber in a stream passing upwardly through the slot in the bottom of the trough. Particulate material, is delivered into the trough through a feed hopper in an inlet module of the apparatus and is caused to move by the air stream in a circulatory fashion in the trough. The granules are carried by the air stream upward in a central region and downward in regions adjacent the sides of the trough. Particles entering the side regions adjacent the side members fall downward under the influence of gravity. The angle of inclination of the trough of the apparatus is selected so that the particulate material travels along the trough from the inlet module to the outlet module at a desired rate and the dam of the apparatus may be used, or not as the case may be, according to the material to be treated.

DESCRIPTION OF THE DRAWING

The above and other of the various objects and several features of the present invention will become more clear from the following description, to be read with reference to the accompanying drawing and in the accompanying drawing:

FIG. 4 is a view in cross-section showing part of an alternative trough for the apparatus; and FIG. 5 is a view showing part of side members of the alternative trough.

DETAILED DESCRIPTION OF THE PREFERRED EMBODIMENT

Figure 1:
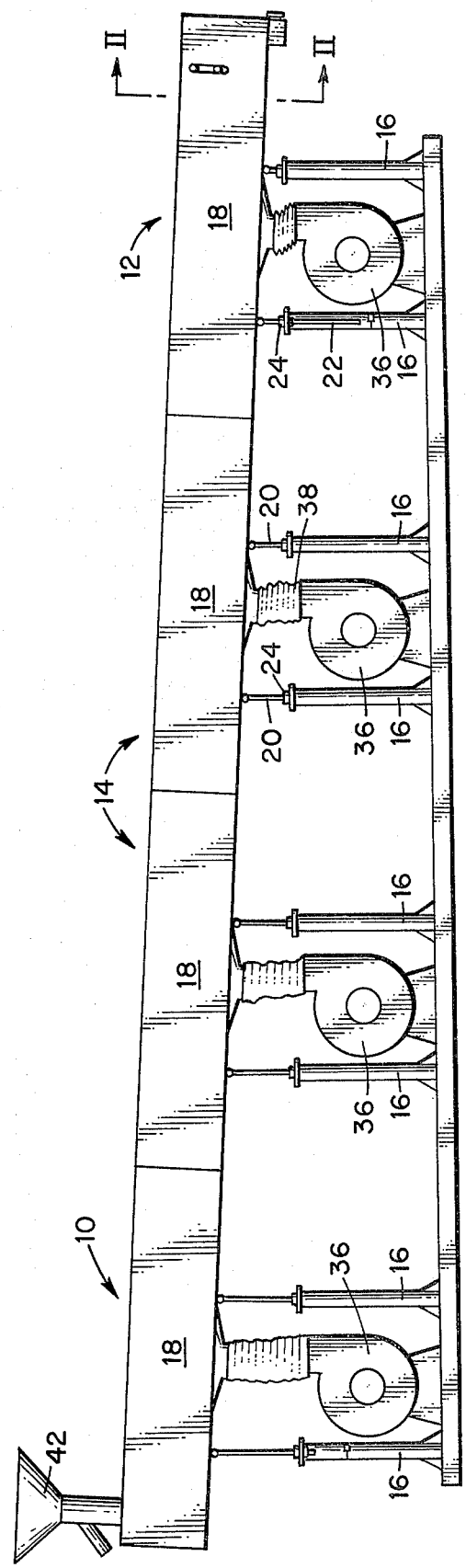
FIG. 1 is a view in side elevation of the apparatus.

The apparatus is of modular construction and comprises an inlet module 10, an outlet module 12, and two intermediate modules 14 connecting the inlet module 10 with the outlet module 12. Each of the modules 10, 12, and 14 comprises frame members 16 by which a body portion 18 of the module is supported. Each of the body portions 18 is of retangular cross-section and is constructed of sheet metal.

Support members 20 are pivotally secured to a lower part of each of the body portions 18. The support members 20 comprise screw threaded portions 22 which pass through holes (not shown) in the frame members 16, the support members 20 being locked in place by nuts 24 screwed onto the threaded portions. The nuts 24 are adjusted along the threaded portions 22 to adjust the angle of inclination of the body portion 18.

A trough 26 (FIGS. 2 and 3) is provided within each of the receiving chamber sections of the body portions 18. Each trough 26 comprises flat side members, upper edge portions of which are secured to upper edge portions of the body portion 18; the side members 28 are inclined at an angle of about 45° to the horizontal and the inclined parts thereof are about 8¼ inches wide. The trough 26 further comprises bottom members 30 provided by flat metal sheets lower portions of which projecting beyond the side members 28 are inclined at an angle of 30° to the horizontal and are about 2¾ inches wide. Upper portions of the bottom members 30 overlap the side members 28 (the bottom members 30 passing beneath the side members 28 and the upper edge portions thereof) with a lateral gap 31 of about ⅛ inch between the lower edge portion of the side members 28 and an upper edge portion of the bottom members 30. Lower edges 32 of the bottom members 30 are spaced apart a distance of about 1½ inches to provide a slot. The depth of the trough from the upper edges of the body portion 18 to the lower edges 32 of the bottom members 30 is about 12 inches. A grating 34 extends across the slot between the lower edges 32 of the bottom members 30, the grating being provided by a fine mesh metal gauze backed by an expanded metal mesh.

The region bounded by the side members 28, bottom members 30 of the trough 26, the walls of the body portion 18 of each of the modules 10, 12 and 14 provides a pressure chamber in that module. Each of the modules 10, 12 and 14 contains a blower unit 36 mounted on the frame members 16. Each of the blower units 36 is connected by ducting 38 to the pressure chamber of the module. The modules 10, 12 and 14 are connected together so that the troughs 26 of the modules form a continuous trough extending the length of the apparatus and having a desired inclination. The pressure chambers of the modules 10, 12 and 14 are, however, kept separate one from the next.

The tops of the troughs 26 are covered by covers 40 which are hinged on the body portion of each of the modules 10, 12 and 14; the covers 40 comprise a large area of metal mesh substantially coextensive with the tops of the troughs 26.

The inlet module 10 of the apparatus comprises a feed hopper 42 into which are delivered, in the operation of the apparatus, plastics granules which are to be cooled by the apparatus. The left-hand end (viewing FIG. 1) of the trough 26 of the inlet module 10 is closed by a sheet metal end member (not shown).

The outlet module comprises a dam 44 at an outlet end portion of the trough 26 of the outlet module 12. The dam 44 comprises a sheet metal member of outline shape to closely fit across the trough 26 when the dam 44 is in a first, vertical position to impede the passage of material along the trough 26. A rectangular opening 46 is cut in the dam 44, the opening being about 6 inches wide, 3 inches in depth, and a lower edge of the opening being spaced about 3 inches from the bottom of the trough. The dam 44 is carried on an axle 48 extending across an upper region of the body portion of the outlet module 12. A handle 50 is secured to a front end portion of the axle 48 so that the dam 44 can be moved between the vertical position in which, the dam impedes flow of material along the trough 26 of the outlet modules, and a second, horizontal position in which flow of material along the trough 26 is not impeded by the dam 44.

Figure 2:
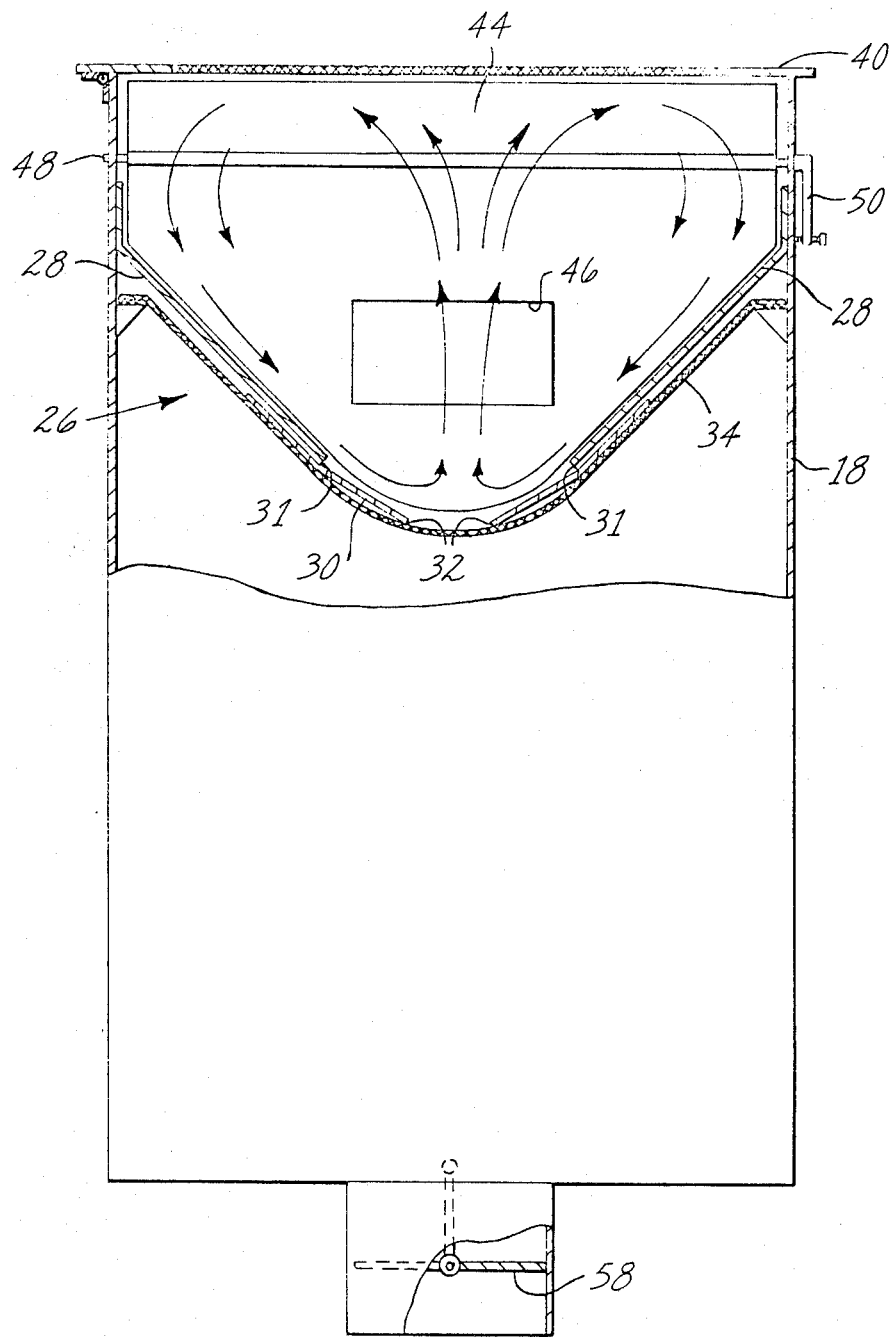
FIG. 2 is a view in cross-section on the line II—II of FIG. 1 showing a trough of the apparatus.
Figure 3:
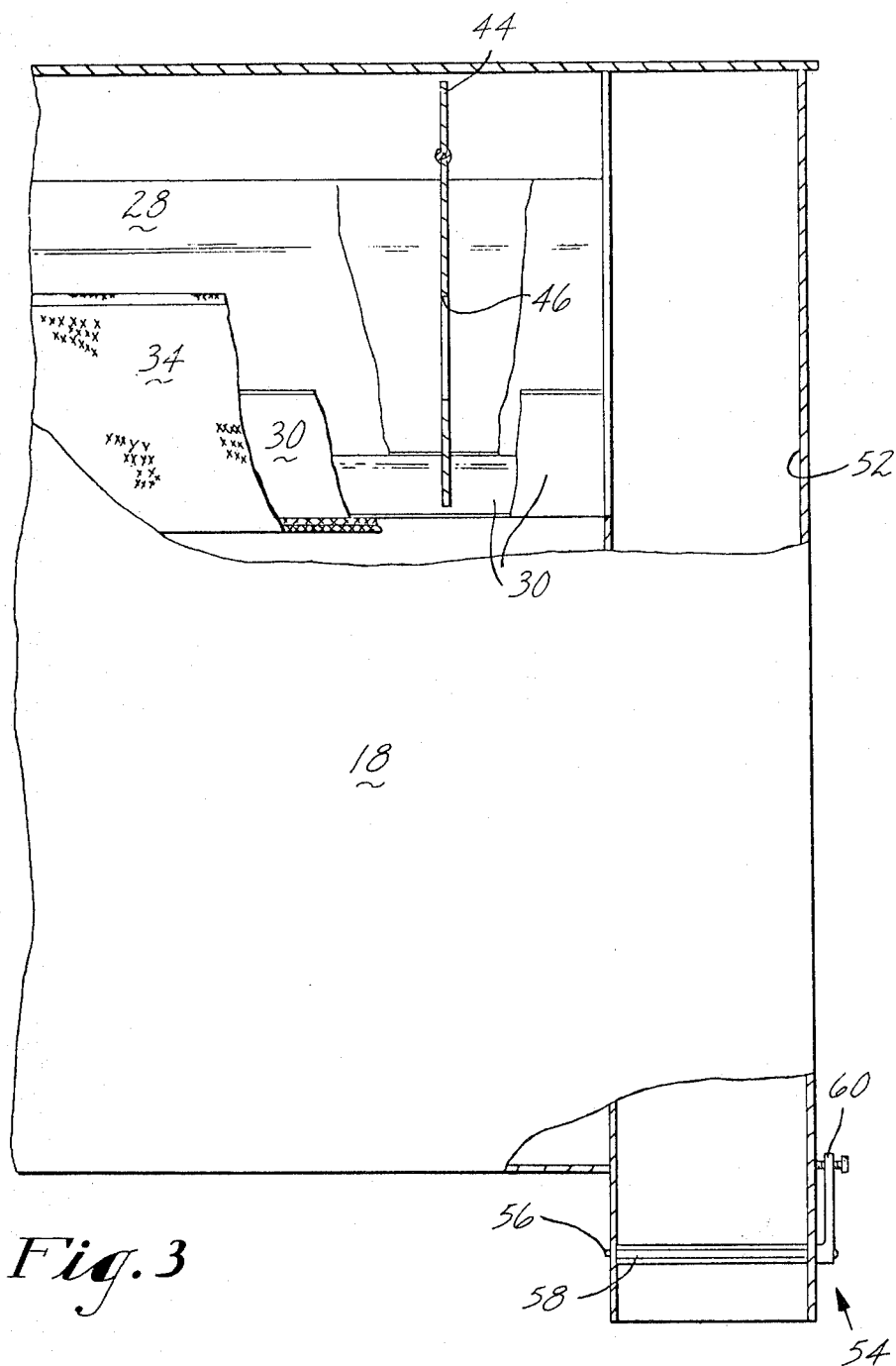
FIG. 3 is a view in side elevation of part of the illustrative apparatus with parts broken away showing an outlet portion of the apparatus.

The trough 26 of the outlet module 12 opens into an outlet passage 52 which extends over the whole of the end portion of the outlet module 12. The outlet passage 52 may be closed by a flap valve 54 mounted in a lower end portion of the outlet passage 52. The flap valve 54 comprises an axle 56 extending across the passage 52, a sheet metal closure member 58 being secured to the axle 56. An operating lever 60 is secured to the axle so that the valve can be operated to move the closure member between a horizontal position (in which it is shown in FIGS. 2 and 3 of the drawings) in which the closure member blocks the outlet passage 52, and a vertical position in which the outlet passage 52 is open.

In operation, the support members 20 of the modules 10, 12 and 14 are adjusted so that the troughs 26 of the modules have a suitable inclination (dependent upon the material to be cooled) the troughs 26 lying at an angle of between 0° and 10° to the horizontal and all the troughs 26 being at the same angle. The blower units 36 are next set into operation and air under pressure is forced through the ducting 38 into the pressure chambers of modules 10, 12 and 14. The air escapes from the pressure chambers through the slot between the lower edges 32 of the bottom members 30 of the trough and through the lateral gaps 31 between the bottom members 30 and the side members 28 of the troughs 26; the air escaping through these latter gaps is directed downward towards the bottom of the trough, while the air escaping from the wide central slot is directed upward and fans out as it leaves the central slot producing a strong blast of air directed generally upward in a central region of the trough and stagnant regions between this central region and the side members 28 of the trough. The configuration of the inside of the pressure chamber and the pressure resistance to air leaving the chamber through the slot and gaps is such as to provide a substantially uniform air flow through the central slot of each of the modules 10, 12 and 14 along the whole of the length of each slot.

The pressure of air in the pressure chambers of the modules 10, 12 and 14 is between 3 and 4 inches of water in excess of the atmospheric pressure; the blast of air passing through the central slot in the central portion of the trough is travelling at a speed of approximately 4,000 feet per minute. Plastics granules to be cooled are fed into the trough 26 of the inlet module through the feed hopper 43 these plastics granules having been produced in a suitable apparatus, from which they are conveyed in a high speed air stream which delivers the granules to the feed hopper 42. The granules arriving at the feed hopper will have been cooled sufficiently to form a hard shell on the outside of the granule while yet there remains a hot sticky core within the shell; this hot sticky core may retain sufficient heat to soften the hard shell to such an extent that the granules, if allowed to contact one another other than momentarily, will stick together. It is thus necessary to further cool the granules.

The apparatus may operate in either of two operational modes, depending on the air pressure and the angle of inclination of the troughs 26; the modes of operation can further be influenced by the use of the dam 44. The first mode of operation (which arises with a steep angle of inclination of the troughs, a high air pressure and with the dam 44 in the horizontal position i.e. not obstructing the trough 26) is especially suitable for cooling more tacky material (or with any given material, hotter material), while the second mode of operation (which is more likely to occur with a shallow angle of inclination, a lower air pressure and use of the dam 44 in the vertical position to impede flow along the troughs) is more suitable for cooling less tacky granules (or granules of the same material but at a lower temperature than is the case where the first mode of operation is preferred). By suitable selection of angle of inclination of the troughs 26, air pressure in the pressure chamber, use of the dam 44, and rate of supply of plastics granules to the inlet module 10, it is possible to achieve a state where the first mode of operation exists in the inlet module and the second mode of operation exists in the outlet module a progressive change occurring in the mode of operation travelling along the troughs from the inlet module to the outlet module.

In the first mode of operation granules in the apparatus are continually in suspension in the air being whirled round in the region bounded by the troughs 26 and the covers 40 for the troughs; plastics granules carried into this region in the air stream in the hopper 42 are caught in the air stream in the central portion of the trough and carried upward towards the cover 40. As the granules approach the cover they tend to fall away towards one of the side members 28 or, if they hit the cover 40, they are deflected towards the side members 28 and enter the region of stagnant air between the central portion and the side members 28. The granules fall downward in this region of stagnant air until they reach the bottom members 30 of the trough 26 and are again caught in the blast of air being directed upwardly through the central slot. Flow of air through the lateral gaps 31 assists in carrying the granules back into the central blast of air. The size of the openings in the grating 34 covering the central slot is such that the granules cannot fall through the openings into the pressure chamber and the size of the openings in the mesh of the cover 40 is such that, likewise, granules are prevented from passing the mesh while the air being blown through the central slot is able to leave through the holes in the cover along with any fines produced. The air leaving through the cover may be collected and filtered to remove the fines which may be re-cycled if desired. Because of the angle of inclination of the troughs 26 (which, conveniently for soft polyvinyl chloride shoe soling compound where the sticky cores of the granules have a temperature of at least 100° C at the inlet end of the illustrative apparatus, is conveniently about 3° to the horizontal) and the statistical effect which is such that movement of the granules tends to occur so that the distribution of the granules throughout the space bounded by the trough 26 and the cover 40 is substantially uniform (because additional granules are continually being introduced through the feed hopper the net effect is to cause the granules to travel along the trough 26 towards the outlet module 12), the granules tend to travel along the troughs 26 from the inlet module 10 to the outlet module 12 and the angle of inclination of the trough can be used to vary the flow rate along the trough. In the first mode of operation the granules are moving as hereinbefore described, on a path indicated generally by the arrows in FIG. 2: the granules are not allowed to come to rest in contact with one another and so there is little chance that granules will adhere to one another and form large aggregations of granules. The air which is blowing in the central blast from the pressure chamber is at ambient temperatures and therefore cools the granules rapidly.

In the second mode of operation, a mass of granules fills a bottom region of the trough and the blast of air expelled through the central slot of the trough 26 sets the granules moving in a circulatory fashion in paths similar to those indicated by the arrows in FIG. 2 except that the granules do not fly free in the air but remain in the mass; the mass has the appearance of boiling. The use of the dam 44 promotes the buildup of the mass of granules in the outlet module. In the second mode of operation the granules do not travel along the length of the trough from inlet end to outlet end as rapidly as granules do in the first mode of operation.

For most granules the apparatus is arranged to operate, as hereinbefore mentioned, so that the apparatus operates in the first mode in the inlet region of the trough and in the second mode at the outlet region of the trough, the granules being sufficiently cooled in the inlet region to ensure that they do not adhere to each other in the outlet region where they are in contact with each other for longer periods; in the outlet region with the apparatus in its second mode of operation, the granules are in continuous motion — were the granules allowed to come to rest before reaching the outlet passage 52, the chances of granules adhering to each other would be considerably increased. Where materials which are very hot and therefore require a considerable amount of cooling before reaching a temperature at which blocking together of granules does not occur, it may be necessary to include further intermediate modules 14 in the illustrative apparatus to increase the length of the apparatus so that the apparatus can be operated in the first mode of operation over a greater length. When the granules flowing along the trough 26 reach the end of the trough in the outlet module 12 they fall into the outlet passage 52 and fall from the lower end of the outlet passage into any suitable container, for example bags; when it is necessary to replace a full bag by an empty one the flap valve 54 is closed to prevent the granules leaving the outlet passage while the empty bag is put in place and granules build up in the outlet passage 52 until the flap valve is opened again.

For most materials, including the polyvinyl chloride pellets hereinbefore mentioned, the total length of the troughs 26 of the apparatus is about 8 meters and the granules pass through the apparatus along the troughs 26 at a rate of about 1650 lbs. per hour. The temperature of the polyvinyl chloride pellets hereinbefore mentioned when they leave the apparatus through the outlet passage having passed through the apparatus in the conditions aforementioned is about 30° C.

Granules are preferably fed into the inlet module at a steady rate but the granules may be supplied to the inlet module intermittently, provided the number delivered at one time is not so great as to cause the granules to stick to each other, without the need to adjust the apparatus.

After feed of granules into the feed hopper 42 has ceased, the apparatus is allowed to continue in operation with the blower units 36 blowing air into the pressure chambers, and the granules will continue to travel along the troughs 26 and into the outlet passage 52 until the troughs 26 are empty. If it is necessary to gain access to the troughs 26, for example to clean them out, the blower units 36 are first switched off and the covers 40 are hinged open to give access to the trough; it is thus very simple to clean out the illustrative apparatus.

Apparatus in accordance with the invention otherwise similar to the illustrative apparatus may comprise, instead of the trough 26 (FIGS. 2 and 3), an alternative trough 62 (see FIGS. 4 and 5). This alternative trough 62 comprises two sheet metal members 64 each comprising an upper portion 66 of the same width as and disposed at the same angle to the horizontal as the side members 28 of the trough 26, and a lower portion 68 of the same width as and disposed at the same angle to the horizontal as the lower portion of the bottom members 30 of the trough 26. The slot between the bottom edges is 1½ inches wide and is covered by a grating 70 similar to the grating 34 of the trough 26. The alternative trough 62 comprises a plurality of louvres 72 in the upper portions 66 of the members 64, the louvres downwardly in a side region adjacent the side walls of the trough 62 in the operation of the apparatus in carrying out a method in accordance with the invention. The louvres 72 thus promote the movement of particulate material in a circulatory fashion in the operation of the illustrative apparatus, the particulate material in the central region of the trough 62 being carried upwardly in the central region thereof by the blast of gas issuing from the central slot and downwardly in the side region aided by gas issuing from the louvres 72.

Having thus described our invention what we claim as new and desire to secure as Letters Patent of the United States is:

1. Apparatus for treating particulate material with a gas comprising:
   a. a body unit having upper and lower interior sections;
   b. a chamber for receiving particulate material formed in the upper interior section of the body unit;
   c. a trough constructed in the receiving chamber and having an elongated opening extending along its bottom; said trough being formed by two pairs of opposing imperforate side walls, an upper pair sloping downward at a first angle and a lower pair sloping downward at a second angle, said first angle being greater when compared to a horizontal than said second angle, the juncture of upper and lower walls having a slot constructed therein for the direction of incoming gas towards the bottom of the receiving chamber;
   d. a pressure chamber formed in the lower interior section of the body member, said chamber communicating directly with the slot in the trough;
   e. a barrier constructed of perforate material located between the pressure chamber and the receiving chamber to prevent the particulate material from entering the pressure chamber but to allow the flow of gas therethrough;
   f. a source of pressurized gas connected to the pressure chamber to supply gas to said chamber, said gas being under sufficient pressure to cause a flow of gas through the slot into the receiving chamber and cause circulation of the particulate material in the receiving chamber; and
   g. means for supporting the body unit to allow the trough to be inclined, thereby providing a generally downward path for the particulate material.

* * * * *